United States Patent
Sikora et al.

(10) Patent No.: US 12,157,263 B2
(45) Date of Patent: Dec. 3, 2024

(54) METHOD AND DEVICE FOR CONTROLLING A PRODUCTION SYSTEM FOR PLANAR OR STRAND-SHAPED BODIES

(71) Applicant: Sikora AG, Bremen (DE)

(72) Inventors: Harald Sikora, Bremen (DE); Christian Schalich, Ritterhude (DE)

(73) Assignee: SIKORA AG, Bremen (DE)

( * ) Notice: Subject to any disclaimer, the term of this patent is extended or adjusted under 35 U.S.C. 154(b) by 642 days.

(21) Appl. No.: 17/281,615

(22) PCT Filed: Sep. 30, 2019

(86) PCT No.: PCT/EP2019/076396
§ 371 (c)(1),
(2) Date: Mar. 31, 2021

(87) PCT Pub. No.: WO2020/070047
PCT Pub. Date: Apr. 9, 2020

(65) Prior Publication Data
US 2021/0370574 A1    Dec. 2, 2021

(30) Foreign Application Priority Data
Oct. 1, 2018   (DE) ............ 10 2018 124 175.5

(51) Int. Cl.
*B29C 48/92*    (2019.01)
*G01N 21/3581*  (2014.01)
(Continued)

(52) U.S. Cl.
CPC ......... *B29C 48/92* (2019.02); *G01N 21/3581* (2013.01); *G01N 21/412* (2013.01);
(Continued)

(58) Field of Classification Search
CPC ............ G01N 21/412; G01N 21/896; G01N 21/8901; G01N 21/3581; G01N 21/35;
(Continued)

(56) References Cited

U.S. PATENT DOCUMENTS 4,831,867 A  *  5/1989  Vasseur ............... G01N 25/60
                                                          73/29.01
10,753,866 B2 *  8/2020  Klose ................. G01N 21/3581
(Continued)

FOREIGN PATENT DOCUMENTS

CA   2786581 A1 * 11/2011 ............ E21B 47/10
CN   102507160 A    6/2012
(Continued)

OTHER PUBLICATIONS

Tan et al "Online Tube Wall Thickness Monitoring Instrument, System and Method", Sep. 7, 2018, WO2018157731 A1. (Year: 2018).*

(Continued)

*Primary Examiner* — Sang H Nguyen
(74) *Attorney, Agent, or Firm* — Barclay Damon LLP

(57) ABSTRACT

A device for controlling a production system for planar or strand-shaped bodies comprises a measurement region and a conveying apparatus configured to convey the body through the measurement region. A transmission apparatus is configured to irradiate the body with measurement radiation in the measurement region. A detection apparatus is configured to detect the measurement radiation reflected by the body. An evaluation apparatus is configured to use the measurement radiation detected by the detection apparatus to determine at least one of: (1) a refractive index of the body; and (2) an absorption of the measurement radiation by the body. A control apparatus is configured to control at least one production parameter of a production system based on the at (Continued)

least one of: (1) the refractive index of the body; and (2) the absorption of the measurement radiation by the body.

8 Claims, 1 Drawing Sheet

(51) Int. Cl.
  *G01N 21/41* (2006.01)
  *G01N 21/896* (2006.01)
(52) U.S. Cl.
  CPC .. *G01N 21/896* (2013.01); *B29C 2948/92247* (2019.02); *B29C 2948/926* (2019.02); *B29C 2948/92742* (2019.02)
(58) Field of Classification Search
  CPC ............. B29C 48/92; B29C 2948/926; B29C 2948/92752; B29C 2948/92257; B29C 2948/92742; B29C 2948/92247; G01B 11/0625; G01B 11/24
  See application file for complete search history.

(56) References Cited

U.S. PATENT DOCUMENTS

| | | | | |
|---|---|---|---|---|
| 2004/0197061 | A1* | 10/2004 | Ogura | G02B 6/02038 385/123 |
| 2008/0192255 | A1* | 8/2008 | Burk | G01F 1/74 356/440 |
| 2009/0045536 | A1 | 2/2009 | Terao | |
| 2009/0059205 | A1* | 3/2009 | Itsuji | G01N 21/3581 356/51 |
| 2011/0276042 | A1* | 11/2011 | Dick | A61F 9/00814 606/5 |
| 2012/0263274 | A1* | 10/2012 | Ouchi | G01N 23/20075 378/62 |
| 2013/0284930 | A1* | 10/2013 | Kato | G01N 15/088 250/353 |
| 2014/0061475 | A1* | 3/2014 | Ryu | G01B 11/06 250/339.06 |
| 2015/0300937 | A1* | 10/2015 | Galiano | G01N 15/05 436/70 |
| 2018/0112973 | A1* | 4/2018 | Sikora | G01J 5/10 |
| 2018/0194055 | A1 | 7/2018 | Nerling | |

FOREIGN PATENT DOCUMENTS

| | | |
|---|---|---|
| CN | 107532883 A | 1/2018 |
| DE | 102015110600 B3 | 12/2016 |
| DE | 102016103298 A1 | 8/2017 |
| DE | 202016008526 U1 | 5/2018 |
| DE | 202018006144 U1 | 6/2019 |
| JP | 2005-043230 A | 2/2005 |
| JP | 2010-156664 A | 7/2010 |
| JP | 2016-537630 A | 12/2016 |
| WO | 2013/007250 A1 | 1/2013 |
| WO | 2016/139155 A1 | 9/2016 |

OTHER PUBLICATIONS

Inoue et al "Method and Apparatus for Determining Authenticity of Paper Sheet Using Terahertz Light", Feb. 17, 2011, JP 2011034173 A (Year: 2011).*
Wietzke S et al: "Terahertz spectroscopy", Solid Dielectrics (ICSD), 10th IEEE International Conference 2010, IEEE, Piscataway, NJ, USA, Jul. 4, 2010, pp. 1-4, ISBN: 978-1-4244-7945-0.
J. Hauck et al.: "Terahertz inline wall thickness monitoring system for plastic pipe extrusion", AIP Conference Proceedings, New York, USA< Jan. 1, 2014, pp. 86-89, ISSN: 0094-243X, DOI; 10.1063/1.4873740.
PCT/EP2019/076396, International Filing Date Sep. 30, 2019. International Search Report and Written Opinion, Date of Mailing Dec. 17, 2019 (14 pages).
PCT/EP2019/076396, International Fiiing Date Sep. 30, 2019, Engiish Transtation of International Search Report, Date of Maiiing Dec. 17, 2019 (3 pages).
RU 2021107850/11, Filing Date Sep. 30, 2019, Office Action dated Jan. 18, 2022 (7 pages).
JP 2021-513249; Filing Date Mar. 3, 2011; Office Action dated Mar. 11, 2022 (7 pages).
CN 201980064642.9, Filing Date Sep. 30, 2019, Office Action dated Jul. 21, 2022 (10 pages).
CN 201980064642.9, Filing Date Sep. 30, 2019, English translation of Office Action dated Jul. 21, 2022 (12 pages).

* cited by examiner

METHOD AND DEVICE FOR CONTROLLING A PRODUCTION SYSTEM FOR PLANAR OR STRAND-SHAPED BODIES

CROSS REFERENCE TO RELATED INVENTION

This application is a national stage application pursuant to 35 U.S.C. § 371 of International Application No. PCT/EP2019/076396, filed on Sep. 30, 2019, which claims priority to, and benefit of, German Patent Application No. 10 2018 124 175.5, filed Oct. 1, 2018, the entire contents of which are hereby incorporated by reference.

TECHNICAL FIELD

The invention relates to a method for controlling a production system for planar or strand-shaped bodies, in which method the body is conveyed in a conveying direction through a measurement region, the body is irradiated with measurement radiation in the gigahertz or terahertz frequency range in the measurement region, wherein the measurement radiation at least partially penetrates the body, and measurement radiation reflected by the body is detected and the refractive index of the body and/or the absorption of the measurement radiation by the body is determined using the detected measurement radiation.

The invention also relates to a device for controlling a production system for planar or strand-shaped bodies, comprising a conveying apparatus for conveying the body in a conveying direction through a measurement region of the device, a transmission apparatus for irradiating the body in the measurement region with measurement radiation in the gigahertz or terahertz frequency range, wherein the measurement radiation at least partially penetrates the body, a detection apparatus for detecting the measurement radiation reflected by the body, an evaluation apparatus which is designed to determine the refractive index of the body and/or the absorption of the measurement radiation by the body using the measurement radiation detected by the detection apparatus.

BACKGROUND

A terahertz measuring apparatus and a terahertz measurement method for ascertaining at least one layer thickness of a test object using propagation time measurement are known, for example from DE 10 2016 103 298 A1. A device and a method for measuring the diameter and/or the wall thickness of a strand even when the refractive index is unknown are also known from WO 2016/139155 A1. Thus, it is possible to exactly determine the diameter and the wall thickness of, for example, tubes even when the refractive index is not or not reliably known.

A device for measuring a tubular strand exiting an extrusion device is known from DE 20 2018 006 144 U1, in which the diameter and/or the wall thickness and/or deviations in shape of the tubular strand can be ascertained by means of terahertz radiation in particular. On the basis of the ascertained values for the diameter and/or wall thickness and/or deviations in shape, the extrusion device can be controlled and/or regulated. For the determination of the diameter or the wall thickness or deviations in shape, the refractive index of the strand material can also be determined.

Furthermore, a method and a device for ascertaining a layer property of an extrusion product generated in an extrusion process by irradiating it with terahertz radiation and measuring at least one feed rate or feed amount of the feed material fed to an extruder are known from DE 10 2015 110 600 B3. DE 10 2015 110 600 B3 addresses the problem that the material density-dependent refractive index is not known in the case of foamed layers of the extrusion product. For non-foamed layers, on the other hand, the refractive index is assumed to be known according to DE 10 2015 110 600 B3. To ascertain the refractive index of foamed layers, DE 10 2015 110 600 B3 proposes using data or measurement signals about the amount of material fed to the extrusion process in addition to measuring the extrusion product with terahertz radiation. According to DE 10 2015 110 600 B3, this amount of material is obtained gravimetrically or volumetrically. The refractive index of the foamed layer ascertained in this manner should provide information about the degree of foaming of the foamed layer. On the basis of the ascertained refractive index, the feed rate of the extruder can be regulated in order to achieve a desired degree of foaming. According to DE 10 2015 110 600 B3, the weight of the material, which is fed to the extruder as a granulate, is measured with the aid of a weighing device. However, in this case the volume can only be determined if the specific weight of the granulate is known and constant. In practice, both of these things are often not the case. Moreover, according to DE 10 2015 110 600 B3, the material input to the extruder is measured and on this basis a prediction is made about the refractive index of a section of the extruded product that is irradiated by the terahertz radiation. However, drawing a conclusion from the input of the extruder about the refractive index of a specific section of the extrusion product produced by the extruder requires that neither the rotational speed nor the puller speed of the extruder, nor the degree of shrinkage due to a change in temperature during extrusion, change. In practice, these requirements are not reliably present, such that the known method is plagued by a corresponding inexactness.

While, according to DE 10 2015 110 600 B3, the refractive index of a foamed layer can be ascertained and used to regulate the feed rate to achieve a desired degree of foaming, DE 10 2015 110 600 B3 assumes a known refractive index for non-foamed layers. In practice, however, the refractive index of non-foamed layers also changes for various reasons. Such changes are not recognized according to DE 10 2015 110 600 B3. In addition, since the refractive index according to DE 10 2015 110 600 B3 is determined indirectly volumetrically or gravimetrically using the material fed to the extruder for extrusion, an assignment to a specific section of the body extruded from the material is difficult, as explained. Correspondingly, the control or regulation of the extrusion system provided according to DE 10 2015 110 600 B3 is also inexact.

There is a need to acquire more information about the production process in order to achieve a more targeted and more exact control of the production system. Starting from the explained prior art, the object of the invention is to improve the control of a production system for planar or strand-shaped bodies.

BRIEF SUMMARY OF THE INVENTION

For a method of the type mentioned at the outset, the invention achieves the object in that at least one production parameter of the production system is controlled on the basis of the refractive index determination and/or the absorption determination, wherein the refractive index and/or the absorption is determined at a plurality of time points during the conveying of the body through the measurement region and the at least one production parameter is controlled on the basis of a change in the refractive index and/or the absorption over time and/or wherein measurement radiation is radiated onto different points of the body, wherein the refractive index and/or the absorption is determined at the different points of the body and the at least one production parameter is controlled on the basis of a spatial change in the refractive index and/or the absorption.

For a device of the type mentioned at the outset, the invention achieves the object in that a control apparatus is provided which is configured to control at least one production parameter of the production system on the basis of the refractive index determination and/or the absorption determination. The evaluation apparatus is configured to determine the refractive index and/or the absorption at a plurality of time points during the conveying of the body through the measurement region. The control apparatus is configured to control the at least one production parameter on the basis of a change in the refractive index and/or the absorption over time, and/or wherein the transmission apparatus is configured to radiate measurement radiation onto different points of the body. The evaluation apparatus is configured to determine the refractive index and/or the absorption at the different points of the body, and wherein the control apparatus is configured to control the at least one production parameter on the basis of a spatial change in the refractive index and/or the absorption.

The strand-shaped or planar bodies produced in the production system can be, for example, bodies made of plastic or glass. The body can be in particular a non-foamed body, which thus has no foamed portion, for example a foamed layer. The strand-shaped body can be, for example, a tubular body, for example a plastic or glass tube. The planar body can be, for example, a plastic or glass plate. At the point in time of the measurement according to the invention, the body produced in the production system can already (basically) have completely taken on its final shape. However, shaping can also not yet be completed at the point in time of the measurement. At the point in time of the measurement, the body can still have very high temperatures of, for example, over 2000° C., in particular if it is a glass body. The body is conveyed in particular in the longitudinal direction through the measurement region and irradiated there with gigahertz or terahertz measurement radiation. Difficult measurement conditions prevail especially in production systems of the type in question here. This applies particularly to a measurement of the body at an early stage while it is still receiving its final shape or when its shaping has just been completed. This is generally desirable in order to be able to respond at an early stage to any impermissible deviations in the production system and to avoid unnecessary rejects. However, in this measurement region there is a high risk of contamination from the production process. In addition, cooling liquid, such as cooling water, is often applied to the body or components of the production system to cool the body or components of the production system. This leads to water splashes and steam formation. Optical measurement methods, for example with laser light, generally have problems in such measurement conditions. Such problems can be avoided by the use according to the invention of gigahertz or terahertz measurement radiation, since such measurement radiation is largely unaffected by difficult measurement environments of the explained type.

The measurement radiation is emitted by a transmission apparatus and guided on the body to be measured. The measurement radiation thereby penetrates the body at least partially, preferably completely. In particular, the measurement radiation can penetrate through the body completely. The measurement radiation is reflected at boundary surfaces of the body and the reflected measurement radiation is received by a receiving apparatus. The transmission apparatus and the receiving apparatus can be combined in a particularly practical manner to form a transceiver. Of course, a plurality of transmission apparatuses and a plurality of receiving apparatuses can also be provided which irradiate the body, for example, from different directions and receive the reflected measurement radiation. If a plurality of transmission apparatuses and receiving apparatuses are provided, they can be combined in pairs in a particularly practical manner to each form a transceiver.

On the basis of the detection of the reflected measurement radiation, the refractive index of the material of the body and the absorption of the measurement radiation by the body can be determined. While DE 10 2015 110 600 B3 assumes a known refractive index for non-foamed layers, the invention takes into account that the refractive index in particular of non-foamed materials can also change in practice for various reasons. Thus, additives are added to the extrusion material for extrusion products, such as, for example, plastic tubes, for various reasons, for example to reduce the conductivity of the material, as sun protection, or the like. For this purpose, users of extrusion systems sometimes use premixed material mixtures, in which the additives are already added by the manufacturer. Sometimes, however, the users also produce the material mixtures themselves by adding additives to the base material themselves. Especially in the latter case, this can lead to undesirable variations of the added amount of additives. If the proportion of one additive added to the extrusion material changes, this can be detected quickly and reliably according to the invention using the refractive index determination and remedied by a corresponding control intervention in the production system.

The determination of the refractive index or the absorption takes place according to the invention in particular directly using the measurement radiation reflected by the body, in particular exclusively using the measurement radiation reflected by the body. To determine the refractive index or the absorption, according to the invention, in particular no gravimetric or volumetric measurements need to take place, for example of a material extruded in an extrusion device, as is still provided in DE 10 2015 110 600 B3. Thus, according to the invention, an assignment of the ascertained refractive index to a specific section of the body is more reliably possible, making a more exact control possible.

In an embodiment, at least one production parameter of the production system is controlled on the basis of the refractive index determination and/or the absorption determination. The invention is based on the surprising discovery that the refractive index and/or the degree of absorption of the measured body, in particular a temporal or spatial change in these values, provide information about the production process, on the basis of which a control of the production process is possible. An irradiation with gigahertz or terahertz radiation often takes place in practice anyway to determine geometric parameters of the body, such as, for example, surface contour, diameter, thickness or wall thickness(es). Correspondingly, at least one geometric parameter of the body can also be determined according to the invention (by the evaluation apparatus), such as, for example, its surface contour, its diameter, its thickness or its wall thickness(es).

As explained, the refractive index can also be ascertained in this case anyway for an exact determination of the geometric parameters. According to the invention, the gigahertz or terahertz radiation and possibly the determination of the refractive index and/or absorption now furthermore is used to draw conclusions about the process and to correspondingly control the process, wherein this control can in particular take place automatically. In this manner, it is possible according to the invention to improve the production process simply and reliably.

The invention is based in particular on the discovery that a temporal or spatial change in the refractive index and/or the absorption is an important parameter for the control or regulation of the production system. For this purpose, the refractive index and/or the absorption is determined according to the invention at a plurality of time points and/or for a plurality of points of the body, in particular distributed over the circumference of the body. According to the invention, undesired changes in the production process are inferred from a change in the ascertained temporally or spatially distributed data for the refractive index and/or absorption. The production system is controlled on this basis.

Ascertaining the refractive index or absorption can take place, for example, at regular time intervals while the body is being conveyed through the measurement region. In this manner, a trend in these data can be detected. Necessary control interventions in the production system can be derived from this. For example, if the value of the refractive index or absorption rises or falls over time, this indicates undesired changes in the production process.

In the case of a strand-shaped body, the measurement radiation can in particular be radiated onto different points distributed over the circumference of the body. In the aforementioned embodiment, a plurality of transmission apparatuses and receiving apparatuses, for example a plurality of transceivers, can be provided, which are arranged such that they guide measurement radiation onto different points of the body and receive the measurement radiation reflected in each case. For example, a plurality of transmission apparatuses and receiving apparatuses, for example a plurality of transceivers, can be arranged distributed over the circumference of a strand-shaped body. However, it would also be conceivable for at least one transmission apparatus and at least one receiving apparatus, for example at least one transceiver, to be arranged spatially changeably, for example rotatably about a strand-shaped body. The aforementioned embodiment enables a spatial distribution of the refractive index or of the absorption to be detected. In turn, necessary control interventions in the production system can be derived therefrom. For example, a systematic change in the values of the refractive index or absorption with the location indicates a faulty production process. For example, if extruded plastic material flows in an undesired manner, the refractive index or the absorption can be different, for example, on the underside of the strand-shaped body than on its upper side as a result. This can be detected and taken into account when controlling the production process.

The absorption can be determined, for example, from a comparison of the intensity of the measurement radiation emitted by the transmission apparatus with the intensity of the measurement radiation received, for example, on a rear boundary surface of the body facing away from the transmission and receiving apparatuses after the reflection. The refractive index can be determined, for example, as explained in WO 2016/139155 A1. In this case, for example, the propagation time of the measurement radiation emitted by the transmission apparatus through the measurement region when the body is arranged in the measurement region can be compared with the propagation time of the measurement radiation through the measurement region without the body arranged therein. The refractive index of the material can then be determined mathematically from the change in propagation time, as explained in more detail below. For this purpose, a transmission apparatus and a receiving apparatus can be arranged, for example, on opposite sides of the measurement region. However, it would also be possible to arrange a transmission apparatus and a receiving apparatus, for example, on one side of the measurement region and to arrange a reflector on an opposite side of the measurement region.

As already explained, the refractive index can be determined from a comparison of the propagation time of the measurement radiation emitted by the transmission apparatus through the measurement region when the body is arranged in the measurement region with the propagation time of the measurement radiation through the measurement region without the body arranged therein. In particular if the body is a tubular body, the propagation time of the measurement radiation emitted by the transmission apparatus through a first wall section facing the transmission apparatus and through a second wall section facing away from the transmission apparatus can be taken into account for the determination of the refractive index.

As explained in WO 2016/139155 A1, for example in the case of tubular bodies, the wall thickness Wd1 of a wall section of the body facing the at least one transmission apparatus or the wall thickness Wd2 of the wall section of the body facing away from the at least one transmission apparatus can be determined with the following formula:

$$W_{d1} = \frac{1}{2}\left(\Delta T_{wd1} - \frac{\Delta T_R \cdot \Delta T_{wd1}}{\Delta T_{wd1} + \Delta T_{wd2}}\right)c$$

$$W_{d2} = \frac{1}{2}\left(\Delta T_{wd2} - \frac{\Delta T_R \cdot \Delta T_{wd2}}{\Delta T_{wd2} + \Delta T_{wd1}}\right)c$$

with:
$\Delta T_{wd1}$ Difference in propagation time between measurement radiation reflected from the outer boundary surface facing the at least one transmission apparatus and from the inner boundary surface facing away from the at least one transmission apparatus of the wall section of the body facing the at least one transmission apparatus.

$\Delta T_{wd2}$ Difference in propagation time between measurement radiation reflected from the inner boundary surface facing the at least one transmission apparatus and from the outer boundary surface facing away from the at least one transmission apparatus of the wall section of the body facing away from the at least one transmission apparatus, $\Delta T_R$ Change in propagation time, caused by the material of the body guided through the device, of the measurement radiation emitted by the at least one transmission apparatus and received by the at least one receiving apparatus after penetrating the body, c Propagation speed of the measurement radiation in air For example, the equation above for Wd1 can be converted to:

$$W_{d1} = \frac{1}{2}\Delta T_{wd1} \cdot c\left(1 - \frac{\Delta T_R}{\Delta T_{wd1} + \Delta T_{wd2}}\right)$$

The following also applies:

$$W_{d1} = \tfrac{1}{2}\Delta T_{wd1} \cdot c_K$$

with:
  cK Propagation speed of the measurement radiation in the body

Thus, the following also applies:

$$c_K = c\left(1 - \frac{\Delta T_R}{\Delta T_{wd1} + \Delta T_{wd2}}\right)$$

Thus, for the refractive index n of the tubular body:

$$n = \frac{c}{c_K} = \frac{1}{\left(1 - \frac{\Delta T_R}{\Delta T_{wd1} + \Delta T_{wd2}}\right)}$$

The refractive index of the tubular body can thus be calculated taking into account the change in propagation time caused by the body and the propagation times of the measurement radiation through the first and second wall sections. Volumetric or gravimetric measurements are not necessary for this purpose.

According to another embodiment, a data trend can be generated using the values for the refractive index and/or absorption determined at a plurality of time points during the conveying of the body through the measurement region. The production system can then be controlled on the basis of a detected change in the data trend over time, for example a falling or rising in the data trend over a specific period of time. For example, for this purpose the data trend can be derived according to time. If the calculated value of the derivation exceeds or falls below a specified setpoint, then a control intervention in the production system can take place.

According to another embodiment, a spatial value distribution can be generated using the values for the refractive index and/or absorption determined at the various points of the body. The production system can then be controlled on the basis of a detected spatial change in the value distribution. As already explained, the refractive index and/or the absorption can be determined in particular at a plurality of points distributed over the circumference of a, for example tubular, body. In this way, a spatial distribution of the ascertained values of the refractive index and/or absorption over the circumference of the tubular body can be ascertained. If in particular a systematic change, for example considerably higher values of the refractive index and/or absorption on the underside of the body compared with the upper side, takes place here, an undesired downward flow of the material, what is known as sagging, can be inferred. This can then be counteracted by corresponding control interventions in the production process. In turn, for example, a spatial derivation of the value distribution can take place. If the calculated value of the derivation exceeds or falls below a specified setpoint, then a control intervention in the production system can take place.

According to another embodiment, the body can be comprised of a plastic material, wherein the production system comprises an extrusion device for extruding the plastic material, wherein at least one production parameter of the extrusion device is controlled on the basis of the refractive index determination and/or the absorption determination. According to another related embodiment, an output capacity of the extrusion device can be controlled as a production parameter. Alternatively or additionally, it is also possible to control, as a production parameter, a mixing ratio of at least two materials to be extruded that are fed to the extrusion device. In extrusion devices, two materials can be mixed to form a mixture to be extruded. In this case, it often involves admixtures in a primary plastic material. For example, graphite or glass fibers can be mixed into a carrier plastic, such as polypropylene (PP) or polyethylene (PE). Such admixtures arc often only present in small proportions of, for example, less than 1% by weight. Setting the mixing ratio is therefore difficult and it is often not reliably possible to detect an incorrect mixing ratio. Premade mixtures, for example, from different manufacturers also vary to a not inconsiderable degree with regard to the mixing ratio. Depending on the material, such admixtures have a considerable influence, for example, on the refractive index. This applies particularly to materials with a refractive index that deviates greatly from the refractive index of the carrier material. This is the case with, for example, graphite or glass fiber admixtures in carrier plastics such as PP or PE. The aforementioned embodiment makes use of this. It was thus surprisingly discovered that an impermissible deviation of the mixing ratio from a specified mixing ratio can be reliably detected on the basis of the determination of the refractive index or of the absorption according to the invention even with small admixture proportions and corresponding interventions can be made in the mixing process in the extrusion device.

As already explained, additives added in particular to a base material in an extrusion system sometimes considerably affects the refractive index or the absorption of the material. According to another embodiment, a proportion of an additive added to the material used for the production of the body can correspondingly be determined using the ascertained values for the refractive index and/or absorption and the production system can be controlled on the basis of the determined proportion of the additive. In this manner, it can be ensured that the desired mixing ratio between the base material and the additive is maintained at all times.

According to another embodiment, the at least one production parameter of the production system can be regulated in a closed control loop on the basis of the refractive index determination and/or the absorption determination. It is then what is known as a closed-loop control. The control apparatus thus forms a closed-loop control apparatus. In particular a fully automatic regulation can take place in which no manual intervention is necessary. The closed-loop control apparatus can receive, for example, an ascertained value for the refractive index and/or the absorption as a control variable. This is compared with a setpoint for the refractive index and/or the absorption as a reference variable. If the comparison results in a control deviation, the closed-loop control apparatus can control production parameters, for example a mixing ratio of an extrusion device, until the control deviation is once again within a permissible range. All embodiments for controlling the production system mentioned in this context can correspondingly also be used to regulate the production system.

The method according to the invention can be performed by the device according to the invention. Accordingly, the device according to the invention can be designed to perform the method according to the invention.

The invention also relates to a production system for planar or strand-shaped bodies, comprising a device according to the invention for controlling the production system, and comprising a conveying apparatus for conveying the body in a conveying direction through the measurement region of the device according to the invention. The device according to the invention or the production system according to the invention can also comprise the planar or strand-shaped body.

BRIEF DESCRIPTION OF THE DRAWINGS

An exemplary embodiment of the invention is explained below in greater detail with reference to figures. Schematically.

The same reference numbers refer to the same objects in the figures unless indicated otherwise.

DETAILED DESCRIPTION OF THE INVENTION

Figure 1:
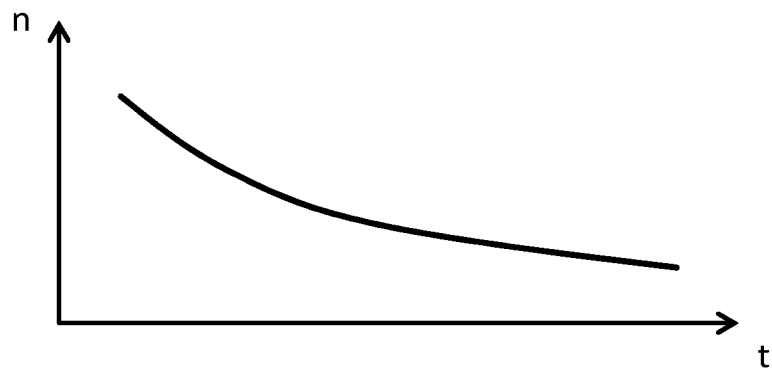
FIG. 1 illustrates a graphical representation of a refractive index of a tubular body ascertained with a device according to the invention or a method according to the invention plotted over time.

In the diagram in FIG. 1, a curve over time of the refractive index determined according to the invention is shown for a body measured in a production system with a device according to the invention or the method according to the invention. In the diagram, the refractive index n is plotted over time t. In the example shown, the refractive index n falls over time.

Figure 2:
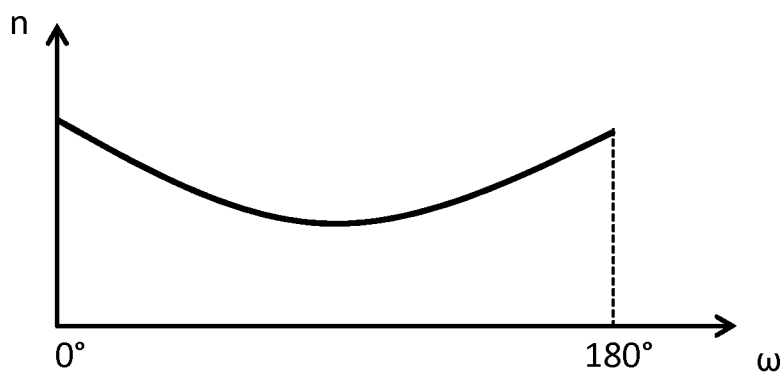
FIG. 2 illustrates a graphical representation of a refractive index of a tubular body ascertained with a device according to the invention or a method according to the invention plotted over an angle of rotation about the tubular body.

In FIG. 2, a spatial curve of the refractive index of a, in particular, tubular body measured in a production system with a device according to the invention or the method according to the invention is shown. In particular, for the diagram in FIG. 2, the refractive index has been ascertained at different points distributed over the circumference of the tubular body. For this purpose, for example, a transmission and receiving apparatus combined as a transceiver has been rotated over the circumference of the tubular body, wherein measurement radiation was emitted onto the tubular body and measurement radiation reflected therefrom was measured by the receiving apparatus. The refractive index n is shown in the diagram in FIG. 2 over the angle of rotation (of the transmission and receiving apparatus. Here it should be noted that the refractive index first passes through a minimum in an angular range between 0° and 180° and then approaches its original value again.

Figure 3:
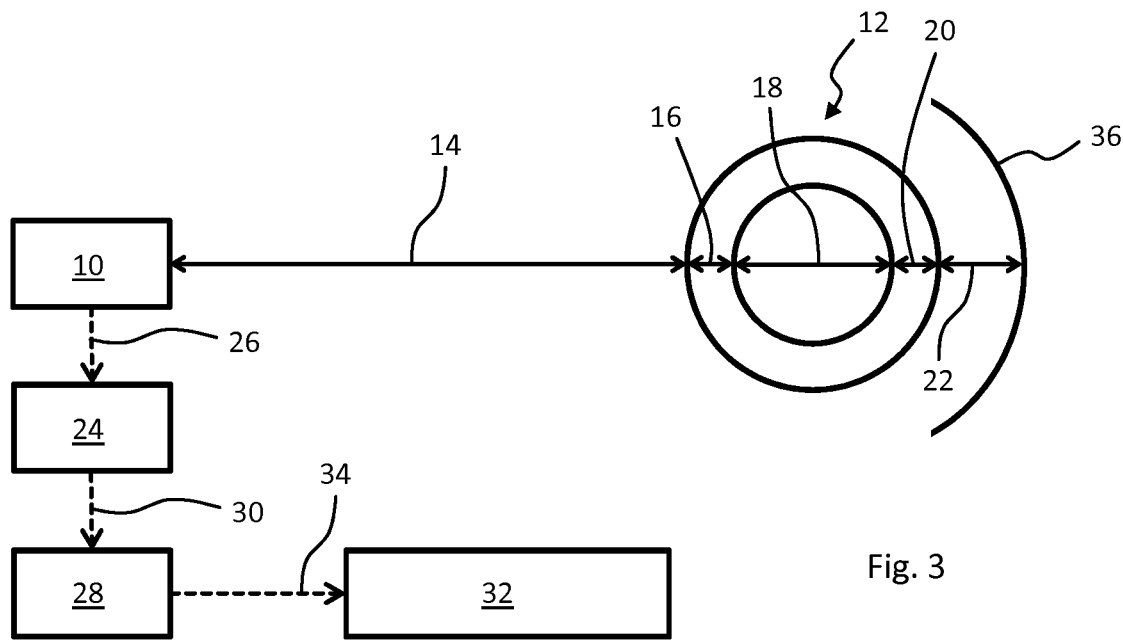
FIG. 3 illustrates a schematic representation of an embodiment of a device according to the invention with the tubular body shown in cross-section.

In FIG. 3, a device according to the invention is shown by way of example with which the values according to the diagrams in FIGS. 1 and 2 can be ascertained. In the example shown, the device comprises a transceiver 10, comprising a transmission apparatus and a receiving apparatus for gigahertz or terahertz radiation. The measurement radiation in the gigahertz or terahertz frequency range is emitted by the transceiver 10 onto a tubular body 12 conveyed in its longitudinal direction through a measurement region of the device, as illustrated by the arrow 14 in FIG. 3. The measurement radiation penetrates the tubular body 12 and is reflected at different boundary surfaces of the tubular body 12, as illustrated by the arrows 14, 16, 18 and 20. A certain proportion of the radiation exits the tubular body 12 again, as illustrated by the arrow 22 in FIG. 3. In the example shown, this proportion of the radiation is reflected by a reflector 36 such that this proportion of the radiation returns back to the transceiver 10. The measurement radiation reflected at the boundary surfaces is also once again received by the transceiver 10. The measurement data from the transceiver 10 are transferred to an evaluation apparatus 24, as illustrated in FIG. 3 by the dashed arrow 26. The evaluation apparatus 24 can, for example in the manner explained above, determine the refractive index of the material of the tubular body 12. This refractive index determination can be repeated during the conveying of the tubular body 12 through the measurement region of the device, for example over a specified period of time at regular intervals, from which a diagram as shown in FIG. 1 can be ascertained. It would also be conceivable to rotate, for example, the transceiver 10 (and the reflector 36) about the tubular body 12, send measurement radiation onto different points distributed over the circumference of the tubular body 12 during the rotation, and receive the reflected measurement radiation and ascertain a spatial distribution of the refractive index therefrom, as shown in the diagram in FIG. 2. In particular when the refractive index is determined in the manner explained above, the measurement values repeat with an angular period of 180°.

The values for the refractive index ascertained by the evaluation apparatus 24 can, in the example shown, be supplied to a closed-loop control apparatus 28, as illustrated in FIG. 3 by the dashed arrow 30. The closed-loop control apparatus 28 can regulate at least one production parameter of the production system shown very schematically in FIG. 3 with the reference number 32, as illustrated in FIG. 3 by the dashed arrow 34. The at least one production parameter can be, for example, a mixing ratio of two materials fed to an extrusion device of the production system.

LIST OF REFERENCE NUMBERS n Refractive index
t Time
ω Angle of rotation
10 Transceiver
12 Tubular body
14 Arrow
16 Arrow
18 Arrow
20 Arrow
22 Arrow
24 Evaluation apparatus
26 Dashed arrow
28 Closed-loop control apparatus
30 Dashed arrow
32 Production system
34 Dashed arrow
36 Reflector

The invention claimed is:
1. A device for controlling a production system for a body that is planar or strand-shaped, the device comprising:
   a measurement region configured to accommodate the body;
   a transmission apparatus configured to irradiate the body with measurement radiation in the measurement region, wherein the measurement radiation is in a frequency range of one of gigahertz and terahertz and is configured to at least partially penetrate the body;
   a detection apparatus configured to detect the measurement radiation reflected by the body;

an evaluation apparatus configured to use the measurement radiation detected by the detection apparatus to determine at least one of: (1) a refractive index of the body; and (2) an absorption of the measurement radiation at different locations on the body and at a plurality of time points while the body is conveyed through the measurement region; and a control apparatus configured to control at least one production parameter of a production system based on the at least one of: (1) the refractive index of the body; and (2) the absorption of the measurement radiation by the body, wherein the control apparatus is configured to control the at least one production parameter on a basis of at least one of: (1) a change in the refractive index; and (2) a change in the absorption over time and wherein the transmission apparatus is configured to radiate measurement radiation onto different points of the body, and wherein the evaluation apparatus is configured to determine the refractive index from a comparison of a propagation time of the measurement radiation emitted by the transmission apparatus through the measurement region when the body is positioned in the measurement region with the propagation time of the measurement radiation through the measurement region without the strand-shaped body positioned therein.

2. The device according to claim 1, wherein the control apparatus is configured to control the at least one production parameter on a basis of a spatial change in at least one of the refractive index and the absorption.

3. The device according to claim 1, wherein the body comprises a tubular shape, and wherein the evaluation apparatus is configured to determine the refractive index using the propagation time of the measurement radiation emitted by the transmission apparatus through a first wall section facing the transmission apparatus and through a second wall section facing away from the transmission apparatus.

4. The device according to claim 1, wherein the body is comprised of a plastic material, wherein the production system comprises an extrusion device configured to extrude the plastic material, and wherein the control apparatus is configured to control at least one production parameter of the extrusion device using at least one of the refractive index of the body and the absorption of the measurement radiation by the strand-shaped body.

5. The device according to claim 4, wherein the at least one production parameter is an output capacity of the extrusion device.

6. The device according to claim 1, wherein the control apparatus forms a closed-loop control apparatus configured to regulate the at least one production parameter of the production system in a closed control loop using the at least one of the refractive index of the body and the absorption of the measurement radiation by the body.

7. A device for controlling a production system for a body that is planar or strand-shaped, the device comprising:
a measurement region configured to accommodate the body:
a transmission apparatus configured to irradiate the body with measurement radiation in the measurement region, wherein the measurement radiation is in a frequency range of one of gigahertz and terahertz and is configured to at least partially penetrate the body;
a detection apparatus configured to detect the measurement radiation reflected by the body:
an evaluation apparatus configured to use the measurement radiation detected by the detection apparatus to determine at least one of: (1) a refractive index of the body; and (2) an absorption of the measurement radiation at different locations on the body and at a plurality of time points while the body is conveyed through the measurement region; and
a control apparatus configured to control at least one production parameter of a production system based on the at least one of: (1) the refractive index of the body; and (2) the absorption of the measurement radiation by the body,
wherein the control apparatus is configured to control the at least one production parameter on a basis of at least one of: (1) a change in the refractive index; and (2) a change in the absorption over time and wherein the transmission apparatus is configured to radiate measurement radiation onto different points of the body, and
wherein the evaluation apparatus is configured to generate a data trend using the at least one of the refractive index and the absorption determined at a plurality of time points during the conveying of the body through the measurement region, and wherein the production system is configured to be controlled using a detected change in the data trend over time.

8. A device for controlling a production system for a body that is planar or strand-shaped, the device comprising:
a measurement region configured to accommodate the body;
a transmission apparatus configured to irradiate the body with measurement radiation in the measurement region, wherein the measurement radiation is in a frequency range of one of gigahertz and terahertz and is configured to at least partially penetrate the body;
a detection apparatus configured to detect the measurement radiation reflected by the body;
an evaluation apparatus configured to use the measurement radiation detected by the detection apparatus to determine at least one of: (1) a refractive index of the body; and (2) an absorption of the measurement radiation at different locations on the body and at a plurality of time points while the body is conveyed through the measurement region; and
a control apparatus configured to control at least one production parameter of a production system based on the at least one of: (1) the refractive index of the body; and (2) the absorption of the measurement radiation by the body,
wherein the control apparatus is configured to control the at least one production parameter on a basis of at least one of: (1) a change in the refractive index; and (2) a change in the absorption over time and wherein the transmission apparatus is configured to radiate measurement radiation onto different points of the body, and
wherein the evaluation apparatus is configured to generate a spatial value distribution using the at least one of the refractive index and the absorption determined at the different points of the body, and wherein the control apparatus is configured to control the production system using a detected spatial change in the spatial value distribution.

* * * * *